F. F. COOK.
WEEDER AND CUTTER.
APPLICATION FILED JUNE 3, 1920.
1,364,720.
Patented Jan. 4, 1921.
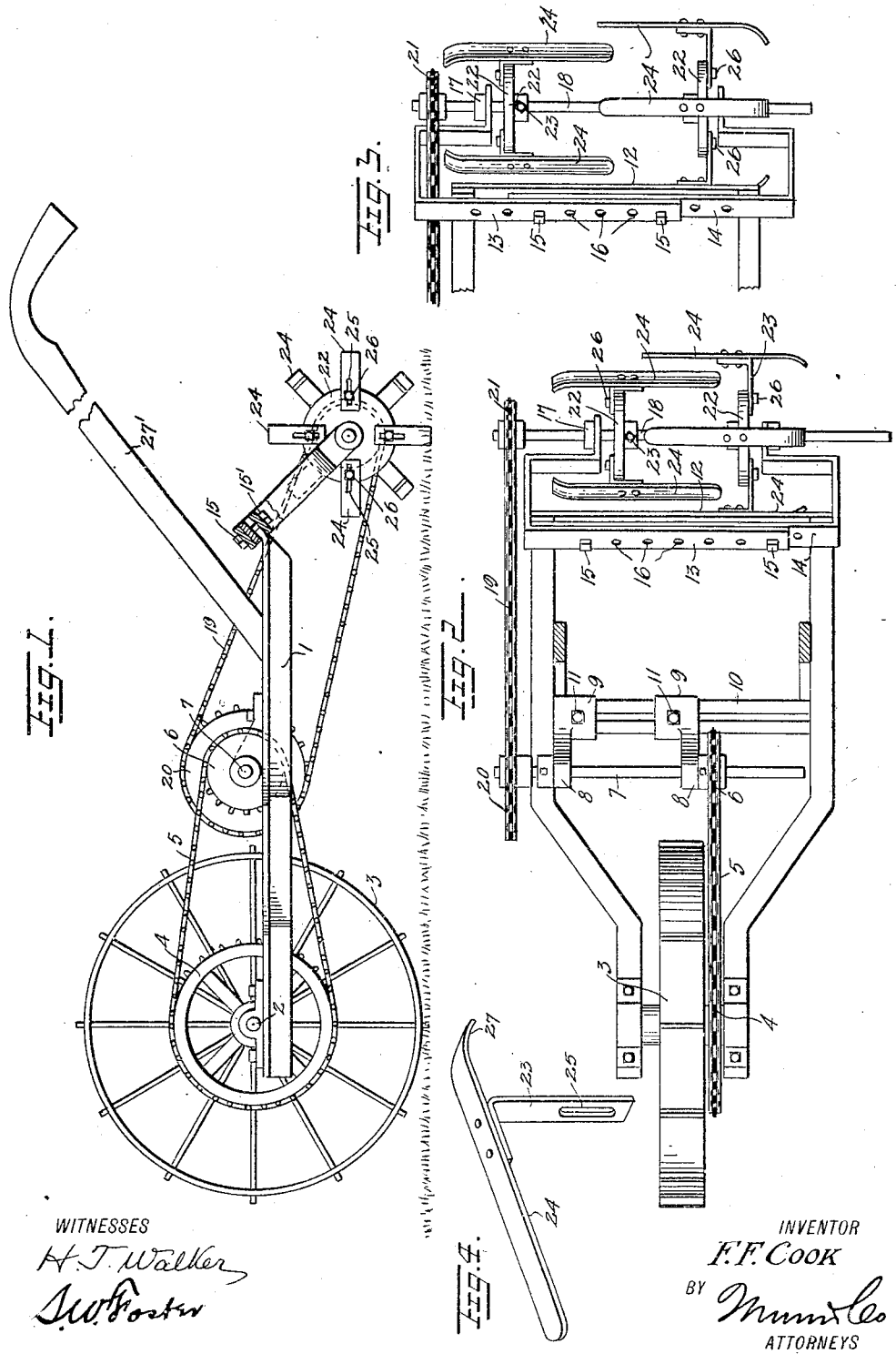

UNITED STATES PATENT OFFICE.

FRANK F. COOK, OF NEWARK, NEW YORK.

WEEDER AND CUTTER.

1,364,720. Specification of Letters Patent. Patented Jan. 4, 1921.

Application filed June 3, 1920. Serial No. 386,296.

*To all whom it may concern:*

Be it known that I, FRANK F. COOK, a citizen of the United States, and a resident of Newark, in the county of Wayne and State of New York, have invented a new and Improved Weeder and Cutter, of which the following is a full, clear, and exact description.

This invention relates to improvements in weeders and cutters, an object of the invention being to provide a hand operated device of the character described which can be easily operated and conveniently adjusted to cut the weeds between rows of any desired width.

A further object is to provide a device of the character stated which can be equipped with any desired number of cutting blades in accordance with the thickness of the weeds to be cut and which can be conveniently manipulated by a single operator to efficiently perform the functions intended.

With these and other objects in view the invention consists in certain novel features of construction, and combinations and arrangements of parts, as will be more fully hereinafter described and pointed out in the claims.

In the accompanying drawings—

Figure 1 is a view in side elevation illustrating my improved weeder and cutter.

Fig. 2 is a top plan view.

Fig. 3 is a fragmentary plan view of the rear portion of the device showing the parts in a different position of adjustment.

Fig. 4 is a perspective view of one of the cutting blades.

1 represents a frame having an axle 2 at its forward end supported in a single traction wheel 3, and on this axle 2 a sprocket wheel 4 is fixed and is connected by a sprocket chain 5 with a sprocket wheel 6 on a countershaft 7. This shaft 7 is supported in bearings 8 constituting portions of brackets 9, said brackets 9 adjustable longitudinally in a slotted bar 10 extending transversely of the frame 1, and bolts 11 are projected through the brackets 9 and slotted bar 10 to secure the bearings at any desired positions of adjustment.

At the rear end of the frame 1 an angularly positioned transverse bar 12 is provided and to this bar 12 a pair of frames 13 and 14 are secured by means of bolts 15 and nuts 15'. The frames 13 and 14 and the bar 12 are made with a series of openings 16 to receive the bolts 15 in any of said openings to permit the frames to be adjusted relative to each other and extended transversely of the frame 1 as far as may be desired in accordance with the operation of the device.

The frames 13 and 14 extend downwardly and rearwardly and are provided with bearings 17 in which a shaft 18 is supported. A sprocket chain 19 connects a sprocket wheel 20 on countershaft 7 with a sprocket wheel 21 on shaft 18 to impart rotary motion to said shaft 18. On this shaft 18 my improved rotary cutters are mounted and each cutter comprises a hub portion 22 secured by a set screw 23 to the shaft 18 so that the hub portions 22 can be adjusted longitudinally of the shaft in accordance with the width of cutting desired.

Each hub 22 is in the form of a disk and each disk supports a circular series of radial arms 23 carrying transversely positioned cutting blades 24. The arms 23 and the cutting blades 24 are rigidly fixed together and constitute single units and the arms 23 have longitudinal slots 25 to receive bolts or screws 26 to secure them to the hubs 22. The blades 24 at one end are curved or rounded, as shown at 27, and these rounded or curved ends 27 are located at the outer portions of the cutters.

It will be noted particularly by reference to Figs. 2 and 3 that the cutting blades of the respective rotary cutters have a staggered relationship so that the inner ends of the blades of one rotary cutter are positioned between the blades of the other rotary cutter so as to effectually cover the ground and sever the weeds along the surface to be cut.

In Fig. 2 it will be noted that the sprocket chain 19 is located outside of the frame 13, but when the cutters are adjusted so that they cut over a wider strip of ground, it is necessary to extend the chain 19 through the frame 13 as shown in Fig. 3.

While I have illustrated each rotary cutter as having four blades, it is obvious that the number may be varied in accordance with the work to be done and the radial adjustment of the blades is provided for by means of the slot 25 and the bolts or screws 26.

A pair of handles 27' is secured to the frame 1 and projects rearwardly therefrom.

In operation, the operator pushes on the handles 27', causing the traction wheel 3 to roll over the ground, and motion is transmitted through the axle 2, sprocket wheel 4, sprocket chain 5, sprocket wheel 6, countershaft 7, sprocket wheel 20, sprocket chain 19, and sprocket wheel 21 to turn the shaft 18, thereby imparting rotary motion to the rotary cutters to sever the weeds and perform the functions desired.

Various slight changes might be made in the general form and arrangement of parts described without departing from the invention, and hence I do not limit myself to the precise details set forth, but consider myself at liberty to make such changes and alterations as fairly fall within the spirit and scope of the appended claims.

I claim:

1. A device of the character stated comprising a main frame, a traction wheel supporting the frame at one end, a pair of cutter frames secured to the main frame, a shaft mounted transversely in the cutter frames, a pair of rotary cutters mounted on the shaft, means for adjusting the cutters longitudinally of the shaft, and means operatively connecting the traction wheel and rotary cutters.

2. A device of the character stated comprising a main frame, a traction wheel supporting the frame at one end, a pair of cutter frames secured to the main frame, a shaft mounted transversely in the cutter frames, a pair of rotary cutters mounted on the shaft, blades on the cutters, the blades on one cutter having staggered relation to the blades on the other cutter whereby the inner ends of the blades of one cutter may be inserted between the blades of the other cutter, and means operatively connecting the traction wheel and rotary cutters.

3. A device of the character stated comprising a main frame, a traction wheel supporting the frame at one end, a pair of cutter frames secured to the main frame, a shaft mounted transversely in the cutter frames, a pair of rotary cutters mounted on the shaft, means for adjusting the cutter frames longitudinally of the shaft, means for adjusting the cutters longitudinally of the shaft, a driving belt operatively connecting the cutters with a driving means, said belt adapted to be positioned either inside or outside of said cutter frame, the position of the driving belt relative to the frame depending upon the width of the path covered by the cutters.

FRANK F. COOK.